United States Patent
Lee

(10) Patent No.: US 9,581,296 B2
(45) Date of Patent: Feb. 28, 2017

(54) SYSTEM FOR SUPPLYING LIQUEFIED NATURAL GAS FUEL AND METHOD OF OPERATING THE SAME

(71) Applicant: HYUNDAI HEAVY INDUSTRIES CO., LTD., Ulsan (KR)

(72) Inventor: Tae Seok Lee, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 273 days.

(21) Appl. No.: 14/060,718

(22) Filed: Oct. 23, 2013

(65) Prior Publication Data
US 2014/0290280 A1 Oct. 2, 2014

(30) Foreign Application Priority Data
Mar. 28, 2013 (KR) ........................ 10-2013-0033192

(51) Int. Cl.
*F17C 7/02* (2006.01)
*F17C 13/00* (2006.01)
*F02M 21/02* (2006.01)
*F02D 19/02* (2006.01)
(Continued)

(52) U.S. Cl.
CPC .......... *F17C 13/002* (2013.01); *F02D 19/022* (2013.01); *F02M 21/0212* (2013.01); *F02M 21/0245* (2013.01); *F17C 13/00* (2013.01); *F04B 23/10* (2013.01); *F17C 2221/033* (2013.01); *F17C 2223/0161* (2013.01); *F17C 2265/066* (2013.01);
(Continued)

(58) Field of Classification Search
CPC ...... F25B 31/008; F25B 31/006; F04B 23/10; F02M 21/0212; F02D 19/022; F17C 2265/066; F17C 13/002

USPC .................................................. 417/201, 203
See application file for complete search history.

(56) References Cited

U.S. PATENT DOCUMENTS

| 3,509,731 A | * | 5/1970 | Shimazawa | ........... F25B 31/006 |
| | | | | 62/469 |
| 5,127,230 A | | 7/1992 | Neeser | |
| 5,860,798 A | | 1/1999 | Tschopp | |

(Continued)

FOREIGN PATENT DOCUMENTS

| CN | 101251047 | 8/2008 |
| CN | 101952635 | 1/2011 |

(Continued)

OTHER PUBLICATIONS

Extended European Search Report dated Jun. 10, 2014 for corresponding European Patent Application No. 13183869.0.
(Continued)

*Primary Examiner* — Jianying Atkisson
*Assistant Examiner* — David Teitelbaum
(74) *Attorney, Agent, or Firm* — Ladas & Parry, LLP

(57) ABSTRACT

A system for supplying LNG fuel includes a fuel supplying line connected from an LNG storage tank to an engine, a boosting pump provided on the fuel supplying line and configured to pressurize LNG outputted from the LNG storage tank and cool down in a standby mode, a high pressure pump configured to pressurize the LNG outputted from the boosting pump to high pressure, and a return line connected between the LNG storage tank and the high pressure pump, in which the LNG is returned through the return line.

9 Claims, 4 Drawing Sheets

(51) Int. Cl.
*F04B 23/10* (2006.01)
*F25B 31/00* (2006.01)
(52) U.S. Cl.
CPC ..... *F17C 2270/0105* (2013.01); *F25B 31/006* (2013.01); *F25B 31/008* (2013.01); *Y02T 10/32* (2013.01)

(56) References Cited

U.S. PATENT DOCUMENTS

2011/0185748 A1* 8/2011 Fuchs .................. F17C 9/02 62/50.2

FOREIGN PATENT DOCUMENTS

| DE | 10 2008 05387 | 5/2010 |
| JP | 2004-76825 | 3/2004 |
| JP | 2005-308149 | 11/2005 |
| JP | 2007-292182 | 11/2007 |
| JP | 2008-202550 | 9/2008 |
| JP | 4570130 | 8/2010 |
| JP | 2010-266068 A | 11/2010 |
| JP | 2011-520081 | 7/2011 |
| KR | 1020110118606 A | 10/2011 |
| KR | 1020120103414 A | 9/2012 |
| KR | 10-1245643 B1 | 3/2013 |
| WO | 94/16986 | 8/1994 |
| WO | 94/23201 | 10/1994 |
| WO | 2009/136793 | 11/2009 |
| WO | 2011/059316 | 5/2011 |
| WO | 2011/078689 | 6/2011 |

OTHER PUBLICATIONS

Office Action dated Aug. 4, 2015 for Japanese Patent Application No. 2013-194613.
Office Action dated Oct. 7, 2014 for Japanese Patent Application No. 2013-194613.
Invalidation Appeal Request for Korean Patent No. 10-1277844.
Decision of Invalidation from Patent Appeal Board decided on Apr. 22, 2015 for Korean Patent No. 10-1277844.
Invalidation Trial Results decided on Apr. 8, 2016 for Korean Patent No. 10-1277844 and its English summary provided by Applicant's foreign counsel.
"Reciprocating Cryogenic Pumps and Pump Installations", IGC Document 159/10/E, European Industrial Gases Association Aisbl., EIGA 2010., pp. 1-11.
"HHI-EMD: your total solution provider for LNG fueled ships", Hyundai Heavy Industries Co., Ltd. Catalog. Nov. 9, 2012.
"ME-GI Dual Fuel MAN B&W Engines", A Technical, Operational and Cost-effective Solution for Ships Fuelled by Gas, MAN Diesel & Turbo, pp. 1-33, 5510-0000-00ppr Mdd 2012, Printed in Denmark.
"DSME HP FGS System" DSME Catalog, Daewoo Shipbuilding & Marine Engineering Co., Ltd., pp. 1-4.
"Reciprocating Pump / Pump Model: 2-SGV", Instruction Handbook for Installation, Operation and Maintenance, ACD, Certified Quality Management System 9001-2008, Nov. 4, 2011.
"Reciprocating Pump / Pump Model: 3-SLS", Instruction Handbook for Installation, Operation and Maintenance, ACD. Certified Quality Management System 9001-2008, Oct. 12, 2003.
"The 4T50ME-GI Test Engine" MAN Diesel & Turbo's Diesel Research Centre Copenhagen, 5510-0107-00ppr, Feb. 2011, printed in Denmark.
Office Action dated Jan. 29, 2016 for Chinese Patent Application No. 201310552838.7 and its English machine translation by Google Translate.
Office Action dated Sep. 19, 2016 for Chinese Patent Application No. 201310552838.7 and its English translation provided by Google translate.

\* cited by examiner

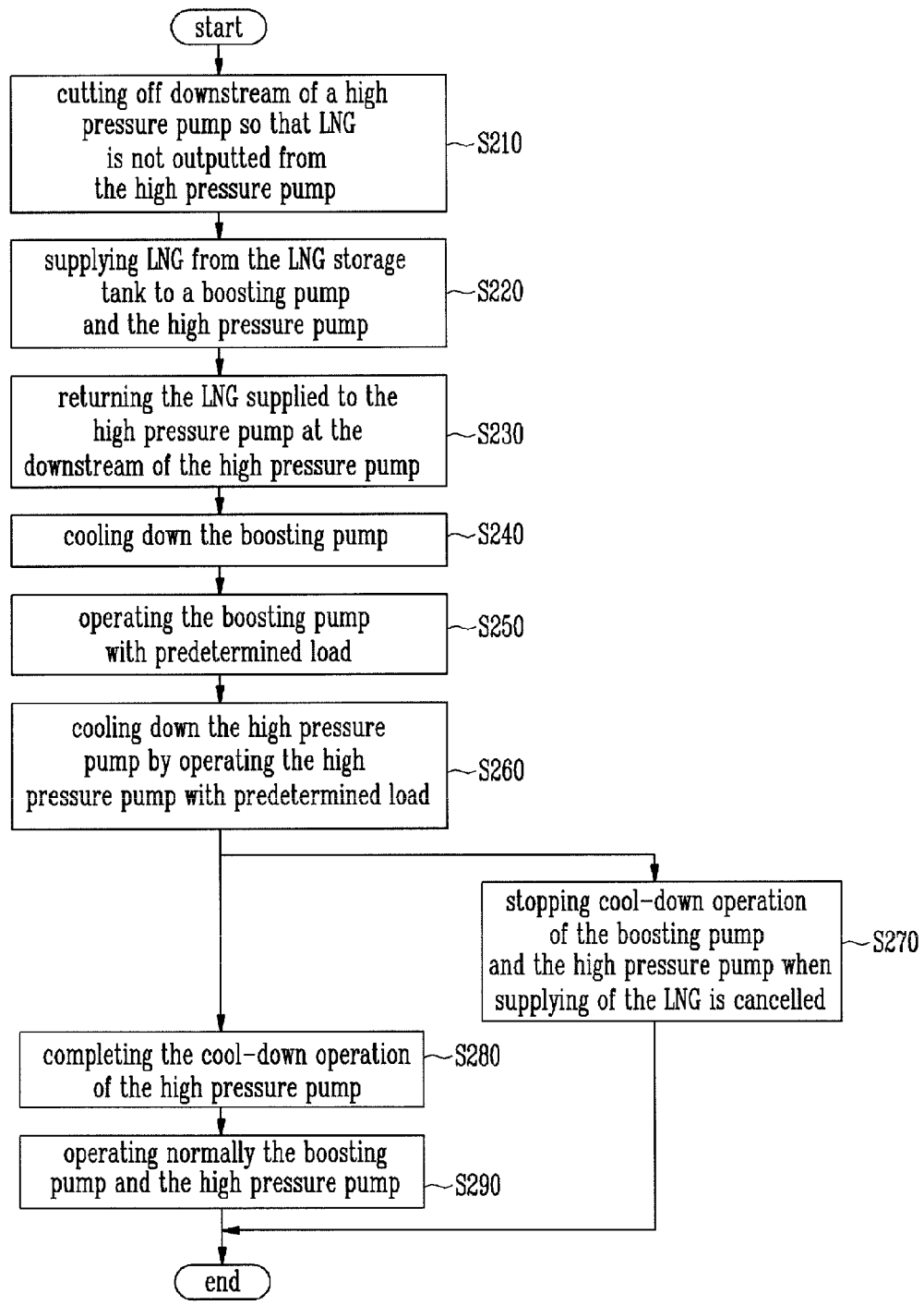

SYSTEM FOR SUPPLYING LIQUEFIED NATURAL GAS FUEL AND METHOD OF OPERATING THE SAME

CROSS-REFERENCE TO RELATED APPLICATION

This application claims priority from Korean Patent Application No. 10-2013-0033192, filed on Mar. 28, 2013, the contents of which are incorporated herein by reference in its entirety.

BACKGROUND

An embodiment of the present invention relates to a system for supplying LNG fuel and a method of operating the same.

A ship is a transport vehicle for sailing across the ocean, carrying bulk of minerals, crude oil, natural gas, several thousands of containers, etc. A ship is made of steel and moves by propulsion generated through the rotation of a propeller when it is floating on a water plane by buoyancy.

A ship generates propulsion by driving an engine. The engine moves a piston using a gasoline or diesel and rotates a crankshaft by a reciprocating motion performed by the piston, so that a shaft connected to the crankshaft rotates to drive the propeller.

However, recently, a Liquefied Natural Gas (LNG) carrier is using LNG fuel supplying method of driving an engine using LNG as a fuel. This LNG fuel supplying method has also been used in other ships in addition to the LNG carrier.

It is generally known that LNG is clean fuel and LNG deposits are greater than oil reserves. LNG consumption has surged with development of a mining technique and a transporting technique. Methane, which is the main component of LNG, is generally kept in a liquid state at a temperature of −162° C. or less under 1 atmospheric pressure. The volume of the liquefied methane is approximately 1/600 of that of methane in a gaseous state as the standard state, and the specific gravity of the liquefied methane is 0.42, which is about half of the specific gravity of the crude oil.

However, the temperature and the pressure, etc. for driving the engine may be different from the state of LNG stored in a tank.

Accordingly, research and development of a technique for supplying LNG to an engine by controlling the temperature and the pressure, etc. of the stored LNG in a liquid state has continued.

SUMMARY OF THE INVENTION

An embodiment of the present invention provides a system for supplying LNG fuel that may supply liquefied natural gas (LNG) after a standby mode is completed, without performing a separate cool-down operation, and may operate an engine stably, and a method of operating the same.

A system for supplying LNG fuel according to one embodiment of the present invention includes a fuel supplying line connected from an LNG storage tank to an engine, a boosting pump provided on the fuel supplying line and configured to pressurize LNG outputted from the LNG storage tank, and cool down in a standby mode, a high pressure pump configured to pressurize the LNG outputted from the boosting pump to high pressure, and a return line connected between the LNG storage tank and the high pressure pump, wherein the LNG is returned through the return line. The LNG is returned from the high pressure pump to the LNG storage tank through the return line when a cool-down operation of the boosting pump is performed.

The high pressure pump cools down in the standby mode, and a cool-down operation of the high pressure pump starts after the cool-down operation of the boosting pump is completed.

The return line is connected to an internal surface of the high pressure pump.

The return line is branched from the fuel supplying line between the high pressure pump and the engine.

The boosting pump pressurizes the LNG to a pressure of 1 bar to 25 bar, and the high pressure pump pressurizes the LNG to a pressure of 200 bar to 400 bar.

A method of operating a system for supplying LNG fuel, including a fuel supplying line connected from an LNG storage tank to an engine, a boosting pump provided on the fuel supplying line and for pressurizing the LNG outputted from the LNG storage tank, a high pressure pump for pressurizing the LNG outputted from the boosting pump to high pressure and a return line connected between the LNG storage tank and the high pressure pump for returning the LNG, the return line through which the LNG is returned from the high pressure pump to the LNG storage tank when a cool-down operation of the boosting pump is performed, the method according to another embodiment of the present invention includes cutting off outputting of the LNG from the high pressure pump, supplying the LNG from the LNG storage tank to the boosting pump and the high pressure pump, returning the LNG supplied to the high pressure pump, cooling down the boosting pump, operating the boosting pump at a predetermined load, completing a cool-down operation of the high pressure pump, and normally operating the boosting pump and the high pressure pump.

The step of cutting off of the outputting of the LNG includes cutting off an outlet of the high pressure pump.

The step of cutting off of the outputting of the LNG includes cutting off downstream of the high pressure pump.

The LNG, supplied to the high pressure pump, is returned at a downstream of the high pressure pump.

The method further includes cooling down the high pressure pump by operating the high pressure pump at a predetermined load after the boosting pump is operated at the predetermined load.

The method further includes stopping the cool-down operations of the boosting pump and the high pressure pump when supplying of the LNG is cancelled.

In a system for supplying LNG fuel and a method of operating the same, LNG is returned in a standby mode, and the LNG is supplied to an engine after the standby mode is completed. Accordingly, a time taken for cooling down the pump after the standby mode is completed is not needed, and thus fuel may be rapidly supplied to an engine.

The LNG is returned from the pump to the LNG storage tank when the cool-down operation of a boosting pump and a high pressure pump is completed, and the pump is normally operated. The system may operate stably the engine by using the LNG of which state is changed, and so operation efficiency of the system may be enhanced.

BRIEF DESCRIPTION OF THE DRAWINGS

The above and other features and advantages of the present invention will become readily apparent by reference to the following detailed description when considered in conjunction with the accompanying drawings wherein:

FIG. 6 is a flowchart illustrating a method of operating the system for supplying LNG fuel according to a second embodiment of the present invention.

DETAILED DESCRIPTION

Hereinafter, the preferred embodiments of the present invention will be explained in more detail with reference to the accompanying drawings.

Figure 1:
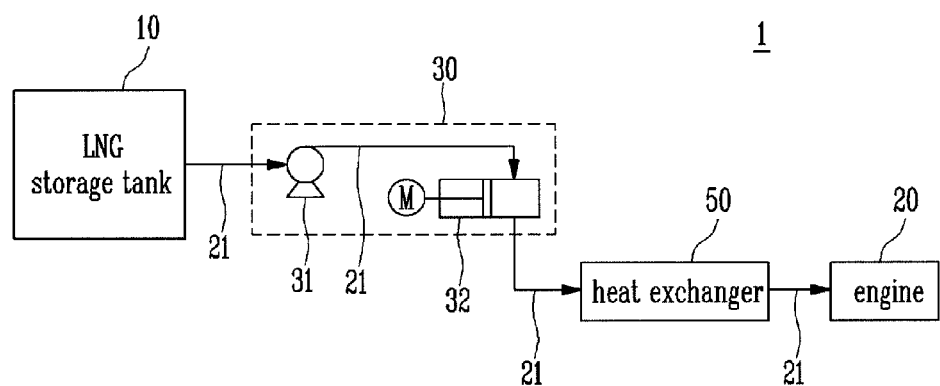
FIG. 1 is a conceptual view of a conventional system for supplying LNG fuel.

FIG. 1 is a conceptual view of a conventional system for supplying liquefied natural gas (LNG) fuel.

In FIG. 1, a conventional system 1 for supplying LNG fuel includes an LNG storage tank 10, an engine 20, a pump 30 and a heat exchanger 50. The pump 30 may include a boosting pump 31 and a high pressure pump 32. The LNG may include natural gas (NG) in supercritical state, etc. as well as an NG in liquid state.

In the system 1, the boosting pump 31 pressurizes LNG outputted from the LNG storage tank 10 through a fuel supplying line 21 to a pressure of several bar to several tens of bar, and then the high pressure pump 32 pressurizes the pressurized LNG to a pressure required for the engine 20, e.g., 200 bar to 400 bar and supplies the pressurized LNG to the heat exchanger 50. Subsequently, the heat exchanger 50 may increase a temperature of the LNG supplied from the pump 30 and supply the LNG in supercritical state to the engine 20. The LNG, supplied to the engine 20, may be in supercritical state in which the LNG has a pressure ranging from 200 bar to 400 bar and a temperature ranging from 30° C. to 60° C.

In the event that the flow of LNG is stopped and then released, for example, when operations of the system 1 is stopped and then resumed, if the LNG into which heat is penetrated due to exposure at room temperature, is supplied to the engine 20, conditions required for the engine 20 may not be satisfied. As a result, the engine 20 may not operate stably, and operation efficiency of the system 1 may be deteriorated. Accordingly, a method of improving operation efficiency has been required.

Figure 2:
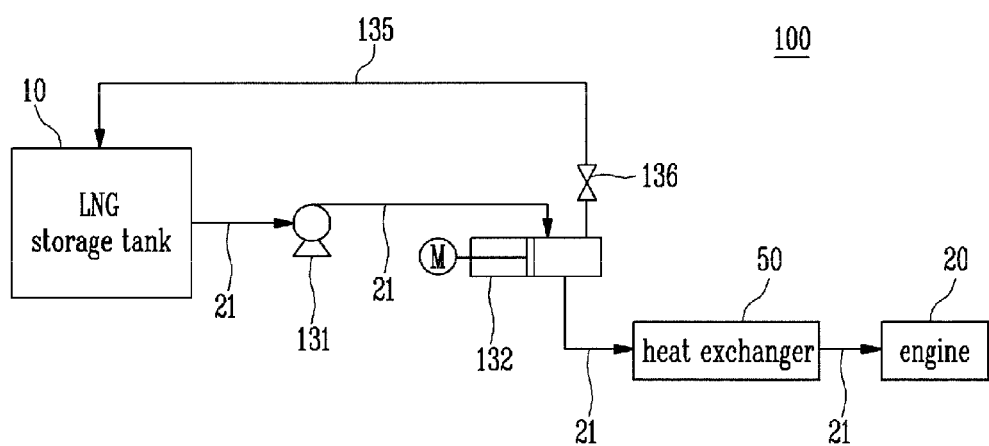
FIG. 2 is a conceptual view of a system for supplying LNG fuel according to a first embodiment of the present invention.
Figure 3:
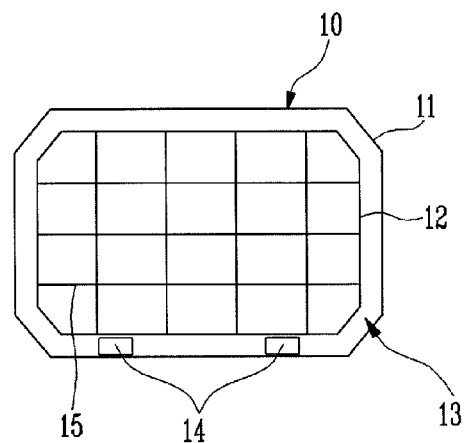
FIG. 3 is a sectional view illustrating an LNG storage tank in the system for supporting LNG fuel according to a first embodiment of the present invention.

FIG. 2 is a conceptual view of a system for supplying LNG fuel according to a first embodiment of the present invention, and FIG. 3 is a sectional view illustrating an LNG storage tank in the system for supporting LNG fuel according to a first embodiment of the present invention.

In FIG. 2, a system 100 for supplying LNG fuel according to an embodiment of the present embodiment may include the LNG storage tank 10, the engine 20, a boosting pump 131, a high pressure pump 132 and the heat exchanger 50. Although the LNG storage tank 10, the engine 20, the heat exchanger 50, etc. are designated by the same reference numerals as shown in the conventional system 1, these components are not necessarily the same as those of the system 1.

The LNG storage tank 10 stores LNG to be supplied to the engine 20. The LNG storage tank 10 stores the LNG in liquid state. Here, the LNG storage tank 10 may be a pressure-type tank.

As shown in FIG. 3, the LNG storage tank 10 may include an outer tank 11, an inner tank 12 and an adiabatic section 13. The outer tank 11 may define an outer wall of the LNG storage tank 10 and be made up of steel. The LNG storage tank 10 may have a polygonal cross-sectional shape.

The inner tank 12 may be formed in the outer tank 11 and may be supported in the outer tank 11 by a support 14. The support 14 may be formed below the inner tank 12 and be further formed on a side of the inner tank 12 to prevent left and right motions thereof.

The inner tank 12 may be made of stainless steel. The inner tank 12 may be designed to withstand a pressure of 5 bar to 10 bar, e.g., 6 bar since internal pressure of the inner tank 12 may be increased as LNG in the inner tank 12 is evaporated to generate evaporation gas.

A baffle 15 may be included in the inner tank 12. The baffle 15 refers to a grid plate. Since the baffle 15 allows internal pressure of the inner tank 12 to be uniformly distributed, the internal pressure may be prevented from being intensively applied to a part of the inner tank 12.

The adiabatic section 13 may be located between the inner tank 12 and the outer tank 11 and cut off transfer of external thermal energy to the inner tank 12. At this time, the adiabatic section 13 may be in a vacuum. The LNG storage tank 10 may withstand high pressure more efficiently as compared to common tanks since the adiabatic section 13 is in a vacuum. For example, the LNG storage tank 10 may withstand a pressure of 5 bar to 20 bar by using the adiabatic section 13 in a vacuum.

Since the system 100 uses the LNG storage tank 10 including the adiabatic section 13 which is located between the outer tank 11 and the inner tank 12 and is in a vacuum, the evaporation gas may be minimally generated. In addition, the LNG storage tank 10 may not be damaged despite an increase in internal pressure thereof.

The engine 20 is driven by the LNG supplied from the LNG storage tank 10 to generate propulsion. Here, the engine 20 may be an MEGI engine or a dual fuel engine.

In the event that the engine 20 is the dual fuel engine, LNG and oil may not be mixed but may be selectively supplied. In this manner, the LNG and the oil having different combustion temperatures from each to other may be prevented from being mixed, so that efficiency of the engine 20 may not be deteriorated.

In the engine 20, as a piston (not shown) in a cylinder (not shown) performs a reciprocating motion by combustion of the LNG, a crankshaft (not shown) connected to the piston may rotate, and a shaft (not shown) connected to the crankshaft may rotate. Thus, since a propeller (not shown) connected to the shaft rotates when the engine 20 is driven, the ship may move forward or backward.

The engine 20 may be configured to drive the propeller, generate electricity, or generate other forces. In other words, the kinds of the engine 20 are not limited. However, the engine 20 may be an internal combustion engine for generating a driving force by combusting the LNG.

The fuel supplying line 21 for delivering the LNG may be provided between the LNG storage tank 10 and the engine 20. The boosting pump 131, the high pressure pump 132 and the heat exchanger 50, etc. may be provided on the fuel supplying line 21 to supply the LNG to the engine 20.

Here, a fuel supplying valve (not shown) may be formed at the fuel supplying line 21, and the supply amount of the LNG may be adjusted depending on an open degree of the fuel supplying valve.

The boosting pump 131 may be provided on the fuel supplying line 21 between the LNG storage tank 10 and the high pressure pump 132. The boosting pump 131 supplies an adequate amount of the LNG to the high pressure pump 132, thereby preventing cavitation of the high pressure pump 132. The boosting pump 131 may extract the LNG from the LNG storage tank 10, and pressurize the extracted LNG in a range of several bar to several tens of bar. The LNG, passing through the boosting pump 131, may be pressurized to the pressure of 1 bar to 25 bar.

The LNG, stored in the LNG storage tank 10, is in liquid state. In this case, the boosting pump 131 may pressurize the LNG outputted from the LNG storage tank 10 to slightly increase the pressure and the temperature of the LNG. The LNG, pressurized by the boosting pump 131, may still be in liquid state.

The system 100 may use oil, e.g., diesel as fuel, which is not shown. Hence, the system 100 may convert the LNG to the diesel, and use the diesel as the fuel. Here, the system 100 is to be operated in a standby mode when the diesel is converted to the LNG, or operations of the system 100 are stopped and then resumed.

The boosting pump 131 may cool down when the system 100 operates in the standby mode as described above. The cool-down of the boosting pump 131 may be performed as the boosting pump 131 operates at a load less than load, e.g., 60% or more at which the boosting pump 131 can operate normally. Here, in the event that the LNG having low temperature flows through the boosting pump 131, internal temperature of the boosting pump 131 may be downed because the LNG having low temperature is contacted with an inner surface of the boosting pump 131. As a result, the cool-down operation of the boosting pump 131 may be realized.

Since the LNG, outputted from the boosting pump 131 during the cool-down operation of the boosting pump 131, does not satisfy temperature and pressure required for the engine 20 the LNG may not be allowed to flow to the engine 20. Instead, a normal operation of the engine 20 may be performed using LNG outputted from the boosting pump 131 which operates normally. This will be described below.

The high pressure pump 132 pressurizes the LNG outputted from the boosting pump 131 to high pressure and supplies the pressurized LNG to the engine 20. The LNG is outputted from the LNG storage tank 10 with a pressure of approximately 10bar and is subsequently primarily pressurized by the boosting pump 131. Subsequently, the high pressure pump 132 secondarily pressurizes the primarily pressurized LNG in liquid state and supplies the secondarily pressurized LNG to the heat exchanger 50.

At this time, the high pressure pump 132 may pressurize the LNG to a pressure of, for example, 200 bar to 400 bar required for the engine 20 and supply the pressurized LNG to the engine 20, so that the engine 20 may generate propulsion by using the LNG.

The high pressure pump 132 may pressurize the LNG in liquid state outputted from the boosting pump 131, to high pressure, and phase-change the LNG so that the LNG may be in supercritical state having higher temperature and pressure than those at the critical point. The temperature of the LNG in the supercritical state may be −20° C. or less, higher than critical temperature.

The high pressure pump 132 may pressurize the LNG in liquid state to high pressure, thereby phase-changing state of the LNG to supercooled liquid state. Here, in the supercooled liquid state, the pressure of the LNG is higher than critical pressure, and the temperature of the LNG is lower than critical temperature.

Particularly, since the high pressure pump 132 may pressurize the LNG in liquid state, outputted from the boosting pump 131, to a pressure of 200 bar to 400 bar, the temperature of the LNG may be lower than the critical temperature. As a result, the phase of the LNG may be changed to the supercooled liquid state. Here, temperature of the LNG in the supercooled liquid state may be −140° C. to −60° C. lower than the critical temperature.

The high pressure pump 132 may cool down by the LNG supplied from the boosting pump 131 after the cool-down operation of the boosting pump 131 is completed. In this case, the high pressure pump 132 may not be operated.

A return line 135 is connected between the LNG storage tank 10 and the high pressure pump 132, and the LNG is returned through the return line 135 to the LNG storage tank 10 which is upstream of the system 100. The LNG is returned from the high pressure pump 132 to the LNG storage tank 10 through the return line 135 when a cool-down operation of the boosting pump 131 is performed.

The return line 135 may be connected to an inner surface of the high pressure pump 132. The return line 135 may prevent the LNG from being outputted through an outlet of the high pressure pump 132 when the boosting pump 131 performs the cool-down of the boosting pump 131 and operates at load less than normal load and when the high pressure pump 132 performs the cool-down of the high pressure pump 132 and does not operate, so that the LNG may not be supplied to the engine 20.

A valve 136 may be a common valve or a three way valve provided on the return line 135. When each of the boosting pump 131 and the high pressure pump 132 performs the cool-down operation, the valve 136 may open the return line 135 to allow the LNG in the high pressure pump 132 to flow to the LNG storage tank 10. Though not shown in FIG. 2, the outlet of the high pressure pump 132 may be closed when the boosting pump 131 cools down.

The heat exchanger 50 may be provided on the fuel supplying line 21 between the high pressure pump 132 and the engine 20 and heat the LNG outputted from the high pressure pump 132. The LNG may be supplied to the heat exchanger 50 by the high pressure pump 132. The heat exchanger 50 may heat the LNG in supercooled liquid state or supercritical state under the pressure of 200 bar to 400 bar of the LNG outputted from the high pressure pump 132, so that the LNG may turn into LNG in supercritical state corresponding to a temperature of 30° C. to 60° C. Subsequently, the heat exchanger 50 may supply the LNG in supercritical state to the engine 20.

The heat exchanger 50 may heat the LNG by using steam supplied through a boiler (not shown), glycol water supplied from a glycol heater (not shown), electric energy or waste heat generated from a generator or facilities, etc. provided in the ship.

Figure 4:
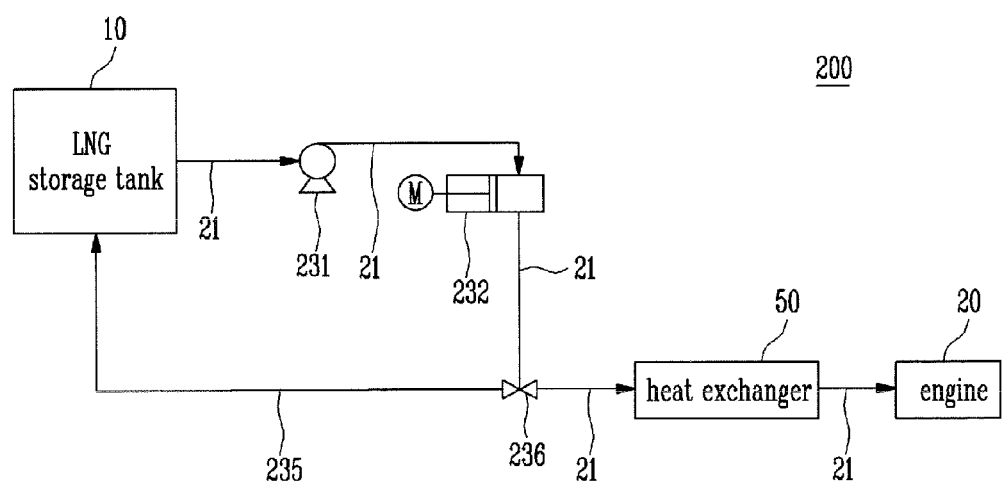
FIG. 4 is a conceptual view of a system for supplying LNG fuel according to a second embodiment of the present invention.

FIG. 4 is a conceptual view of a system for supplying LNG fuel according to a second embodiment of the present invention. Like reference numerals refer to like or corresponding elements, and thus their description will be omitted.

A system 200 for supplying LNG fuel will be described in detail with reference to FIG. 4. The system 200 is substantially the same as the system 100 except for a cool-down operation of a high pressure pump 232 and an operation of cutting off downstream of a high pressure pump 232. In the first embodiment, the outlet of the high pressure pump 232 is cut off. In the present embodiment, a cool-down operation of the high pressure pump 232 may start after a cool-down operation of the boosting pump 231 is completed. The cool-down operation in the present embodiment may be performed with load lower than normal load, e.g., 60% or more, in the same or similar manner as the cool-down operation of the boosting pump 131 in the first embodiment.

Since the LNG, outputted from the high pressure pump 232 during the cool-down operation of the high pressure pump 232, does not satisfy temperature and pressure required for the engine 20, the system 200 cuts off supplying of the LNG to the engine 20 and normally operates the engine 20 using LNG, outputted from the boosting pump 231 and the high pressure pump 232 which operate normally. In this case, the LNG, outputted from the high pressure pump 232, may be returned to the LNG storage tank 10 through a return line 235.

In the event that the high pressure pump 232 operates at load less than normal load to cool down, the LNG outputted through the outlet of the high pressure pump 232 may be returned to the LNG storage tank 10. Thus, the return line 235 may be connected to the outlet of the high pressure pump 232. The return line 235 may be branched from the fuel supplying line 21 and connected to the LNG storage tank 10.

A valve 236 may be provided between the return line 235 and the fuel supplying line 21. The valve 236 may be a common valve or a three way valve. The valve 236 closes downstream of the fuel supplying line 21 and opens the return line 235 when the cool-down operation of the high pressure pump 232 is performed, thereby returning the LNG outputted through the outlet of the high pressure pump 232 to the LNG storage tank 10.

Hereinafter, methods of operating the systems 100 and 200 will be described in detail. A detailed description of the same functions and effects as in the above embodiments will be omitted.

A method of operating the system 100 will be described in detail with reference to FIG. 2.

Figure 5:
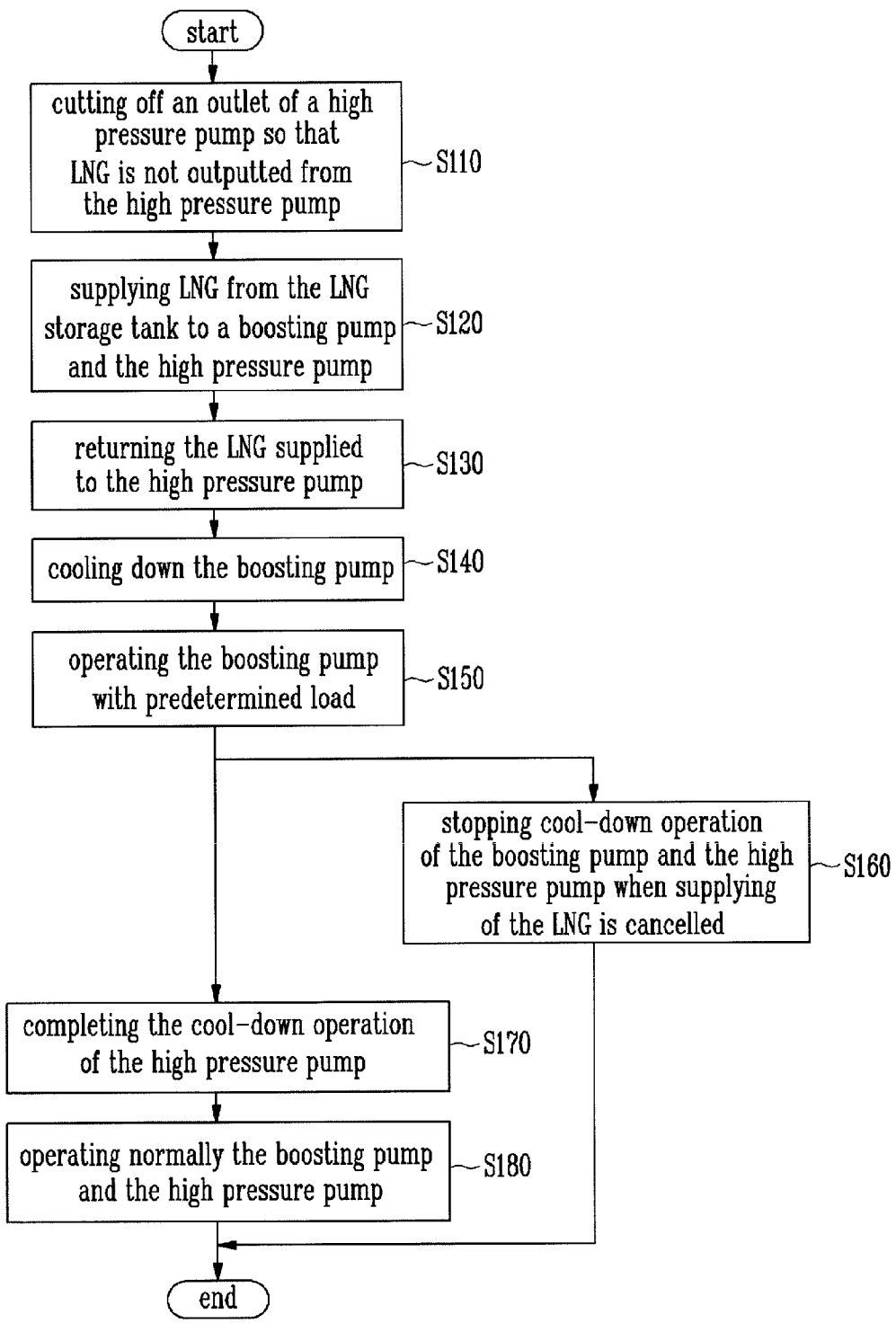
FIG. 5 is a flowchart illustrating a method of operating the system for supplying LNG fuel according to a first embodiment of the present invention.

FIG. 5 is a flowchart illustrating a method of operating the system for supplying LNG fuel according to a first embodiment of the present invention.

As shown in FIG. 5, the method of operating the system 100 in FIG. 2 may include step S110 of cutting off the outlet of the high pressure pump so that the LNG is not outputted from the high pressure pump, step S120 of supplying the LNG from the LNG storage tank to the boosting pump and the high pressure pump, step S130 of returning the LNG supplied to the high pressure pump, step S140 of cooling down the boosting pump, step S150 of operating the boosting pump at a predetermined load, step of S160 of stopping cool-down operation of the boosting pump and the high pressure pump when supplying of the LNG is cancelled, step S170 of completing the cool-down operation of the high pressure pump, and step S180 of normally operating the boosting pump and the high pressure pump.

At step S110, the outlet of the high pressure pump 132 is cut off so that the LNG may not be outputted from the high pressure pump 132. For example, the system 100 is to be operated in the standby mode when the system 100 receives a signal for converting the diesel to the LNG or is resumed after being stopped. At this time, the boosting pump 131 operates at a load smaller than normal load, the high pressure pump 132 is in a standby state, and thus the LNG does not satisfy temperature and pressure required for the engine 20. Accordingly, the outlet of the high pressure pump 132 is cut off so that the LNG may not be supplied to the engine 20.

At step S120, the LNG is supplied from the LNG storage tank 10 to the boosting pump 131 and the high pressure pump 132. The LNG having low temperature is outputted from the LNG storage tank 10 so that the cool-down operation of the boosting pump 131 and the high pressure pump 132 may start. At this time, a valve (not shown) may be equipped to the outlet of the LNG storage tank 10, and the amount of supply of the LNG may be adjusted depending on open level of the valve.

At step S130, the LNG, supplied to the high pressure pump 132, is returned. Since the fuel supplying line 21 is filled with the LNG though the system 100 is in a stop state, the LNG, before the standby mode starts, is outputted from the boosting pump 131 and the high pressure pump 132 by the amount of the LNG outputted from the LNG storage tank 10, and the outputted LNG is returned to the LNG storage tank 10.

At step S140, the boosting pump 131 is cooled down. The LNG, outputted from the LNG storage tank 10 at step S130, may lower internal temperature of the boosting pump 131 while the LNG having a temperature lower than the temperature of the boosting pump 131 flows through the boosting pump 131. At step S140, the boosting pump 131 may contact the LNG, outputted from the LNG storage tank 10, before the boosting pump 131 operates, and so the internal temperature of the boosting pump 131 may be lowered.

At step S150, the boosting pump 131 may operate at a predetermined load. The boosting pump 131 operates at step S150, unlike step S140. The boosting pump 131 may operate at the load smaller than normal load, e.g., 60% or more, thereby accelerating the flowing of the LNG. At this time, the LNG may flow in the boosting pump 131 as the boosting pump 131 operates, and then be outputted from the boosting pump 131, so that the internal temperature of the boosting pump 131 may be lowered.

At step S160, the cool-down operations of the boosting pump 131 and the high pressure pump 132 are stopped when the supplying the LNG is cancelled. Since the system 100 can use the diesel and the LNG as described above, the standby operation may be stopped when the operations of the boosting pump 131 and the high pressure pump 132 are cancelled, for example, when fuel conversion from the diesel to the LNG is cancelled, the LNG is converted to the diesel, or the system 100 is stopped. At this time, the cool-down operations of the boosting pump 131 and the high pressure pump 132 are stopped.

At step S170, the cool-down operation of the high pressure pump 132 is completed. In the event that step S160 is not performed and the standby operation of the system 100 is continuously performed, the cool-down operation of the high pressure pump 132 may be performed after the cool-down operation of the boosting pump 131 is completed. The LNG, outputted from the boosting pump 131 and having the temperature lower than the temperature of the high pressure pump 132, may contact the inner surface of the high pressure pump 132, and thus the internal temperature of the high pressure pump 132, which is a relatively high temperature, may be lowered.

At step S180, the boosting pump 131 and the high pressure pump 132 operate normally. In the event that the cool-down operations to of the boosting pump 131 and the high pressure pump 132 are completed through the above steps, heat-penetration from the outside to the LNG may be reduced. The boosting pump 131 and the high pressure pump 132 operate normally at normal load, e.g., 60% or more, so as to satisfy the temperature and the pressure of the LNG required for the engine 20.

A method of operating the system 200 according to a second embodiment will be described in detail with reference to FIG. 4.

FIG. 6 is a flowchart illustrating a method of operating the system for supplying LNG fuel according to a second embodiment of the present invention.

As shown in FIG. 6, the method of operating the system 200 in FIG. 4 may include step S210 of cutting off downstream of the high pressure pump so that the LNG is not outputted from the high pressure pump, step S220 of supplying the LNG from the LNG storage tank to the boosting pump and the high pressure pump, step S230 of returning the LNG supplied to the high pressure pump through downstream of the high pressure pump, step S240 of cooling down the boosting pump, step S250 of operating the boosting pump with predetermined load, step of S260 of cooling down the high pressure pump by operating the high pressure pump at a predetermined load, step S270 of stopping cool-down operation of the boosting pump and the high pressure pump when supplying of the LNG is cancelled, step S280 of completing the cool-down operation of the high pressure pump, and step S280 of operating normally the boosting pump and the high pressure pump.

The system 200 according to the present embodiment is substantially the same as in the first embodiment except for the cool-down operation of the high pressure pump 232 and a method of cutting off of the downstream of the high pressure pump 232. In the first embodiment, the outlet of the high pressure pump 232 is cut off.

At step S210, the downstream of the high pressure pump 232 is cut off so that the LNG may not be supplied from the high pressure pump 232 to the engine 20. For example, the system 200 is to be operated in a standby mode when the system 200 receives a signal for converting the diesel to the LNG or operates again after being stopped. At this time, the boosting pump 231 operates at a load smaller than normal load, the high pressure pump 232 is in a standby state, and thus the LNG does not satisfy temperature and pressure required for the engine 20. Accordingly, the method cuts off the downstream of the high pressure pump 132 so that the LNG may not be supplied to the engine 20.

In the first embodiment, the high pressure pump 232 does not operate at a load smaller than normal load, and cools down by using only the flowing of the LNG through the boosting pump 231. However, in the present embodiment, the high pressure pump 232 also cools down by operating it at the load smaller than normal load, and the downstream of the high pressure pump 232 is cut off so that the LNG may not be outputted through the downstream of the high pressure pump 232.

At step S220, the LNG is supplied from the LNG storage tank 10 to the boosting pump 231 and the high pressure pump 232. The LNG having low temperature is outputted from the LNG storage tank 10 so that the cool-down operation of the boosting pump 231 and the high pressure pump 232 can start. At this time, a valve (not shown) may be equipped to the outlet of the LNG storage tank 10, and the amount of supply of the LNG may be adjusted depending on an open degree of the valve.

At step S230, the LNG supplied to the high pressure pump 232 is returned at the downstream of the high pressure pump 232. Since the fuel supplying line 21 is filled with the LNG even when the system 200 is in a stop state, the LNG, before the standby mode starts, is outputted from the boosting pump 231 and the high pressure pump 232 by the amount of the LNG outputted from the LNG storage tank 10, and the outputted LNG is returned to the LNG storage tank 10.

Since the high pressure pump 232 operates at a load smaller than normal load and cools down, the LNG may be outputted through an outlet of the high pressure pump 232 when the cool-down operation of the high pressure pump 232 is performed. Accordingly, the LNG, supplied to the high pressure pump 232, may be returned through the downstream which is the outlet of the high pressure pump 232.

At step S240, the boosting pump 231 cools down. The LNG, outputted from the LNG storage tank 10 at step S230, may lower internal temperature of the boosting pump 231 because it flows through the boosting pump 231 with a temperature lower than the temperature of the boosting pump 231. At step S240, the boosting pump 231 may contact the LNG, outputted from the LNG storage tank 10, before the boosting pump 231 operates, so that the temperature of the boosting pump 231 may be lowered.

At step S250, the boosting pump 231 operates at a predetermined load. The boosting pump 231 operates at step S250, unlike step S240. The boosting pump 231 may operate at a load smaller than normal load, e.g., 60% or more, thereby accelerating the flowing of the LNG. At this time, the LNG may flow in the boosting pump 231 according as the boosting pump 231 operates, and then be outputted from the boosting pump 231, so that the internal temperature of the boosting pump 231 may be lowered.

At step S260, the high pressure pump 232 operates at the predetermined load and cools down. The high pressure pump 232 may operate at the load smaller than normal load, in the same or similar manner as the boosting pump 231, thereby accelerating the flowing of the LNG to cool-down the high pressure pump 232.

At step S270, the cool-down operations of the boosting pump 231 and the high pressure pump 232 are stopped when the supplying the LNG is cancelled. Since the system 200 can use the diesel and the LNG as described above, the standby operation may be stopped when the operations of the boosting pump 231 and the high pressure pump 232 are cancelled, for example, when fuel conversion from the diesel to the LNG is cancelled, the LNG is converted to the diesel is cancelled, or the system 200 is stopped. Here, the cool-down operations of the boosting pump 231 and the high pressure pump 232 are stopped.

At step S280, the cool-down operation of the high pressure pump 232 is completed. In the event that step S270 is not performed and the standby operation of the system 200 is continuously performed, the cool-down operation of the high pressure pump 232 may be performed after the cool-down operation of the boosting pump 231 is completed. The LNG, having the temperature lower than the temperature of the high pressure pump 232, outputted from the boosting pump 231, may contact the inner surface of the high pressure pump 232, and thus the temperature of the high pressure pump 232 may be lowered.

At step S290, the boosting pump 231 and the high pressure pump 232 operate normally. In the event that the cool-down operations of the boosting pump 231 and the high pressure pump 232 are completed through the above steps, heat-penetration from the outside to the LNG may be reduced. The boosting pump 231 and the high pressure pump 132 operate at normal load, e.g., 60% or more, so as to satisfy the temperature and the pressure of the LNG required for the engine 20.

In a system for supplying LNG fuel and a method of operating the same, the LNG is returned in the standby mode, and the LNG is supplied to the engine 20 after the standby mode is completed. Accordingly, a time taken for cooling down the pumps 131, 132, 231 and 232 after the standby mode is completed is not needed, and thus fuel may be rapidly supplied to the engine 20.

The LNG is returned to the LNG storage tank 10 when the cool-down operation of the boosting pump 131 or 231 and the high pressure pump 132 or 232 is completed, and subsequently the pumps 131, 132, 231 and 232 are normally operated. As a result, the engine 20 may be stably operated by using the LNG of which state is changed, and so operation efficiency of the system 100 and 200 may be enhanced.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A system for supplying LNG fuel, the system comprising:
    a fuel supplying line connected from an LNG storage tank to an engine;
    a boosting pump provided on the fuel supplying line and configured to pressurize LNG outputted from the LNG storage tank, and cool down in a standby mode;
    a high pressure pump configured to pressurize the LNG outputted from the boosting pump to high pressure; and
    a return line connected between the LNG storage tank and the high pressure pump,
    wherein the LNG is returned to the LNG storage tank through the return line,
    wherein the return line is connected to an internal surface of the high pressure pump,
    wherein during the standby mode the LNG is not outputted from the high pressure pump to the engine and the return line connected to the high pressure pump is configured to be open,
    wherein the LNG is returned from the high pressure pump to the LNG storage tank through the return line when a cool-down operation of the high pressure pump is performed, and
    wherein the boosting pump is configured to operate during the standby mode to increase a flow of the LNG supplied to the high pressure pump.

2. The system of claim 1, wherein the high pressure pump cools down in the standby mode, and a cool-down operation of the high pressure pump starts after a cool-down operation of the boosting pump is completed.

3. The system of claim 1, wherein the boosting pump pressurizes the LNG to a pressure of 1 bar to 25 bar, and the high pressure pump pressurizes the LNG to a pressure of 200 bar to 400 bar.

4. The system of claim 1, wherein the boosting pump is provided between the LNG storage tank and the high pressure pump.

5. The system of claim 1, wherein the high pressure pump is configured to pressurize the LNG to change a state of the LNG from a liquid state to a supercritical state or a super-cooled liquid state.

6. The system of claim 1, further comprising a heat exchanger positioned between the high pressure pump and the engine and configured to heat the LNG to supply the LNG in a supercritical state at a temperature of 30° C. to 60° C.

7. The system of claim 1, further comprising a valve provided on the return line and configured to open the return line to allow the LNG in the high pressure pump to flow to the LNG storage tank when the high pressure pump performs the cool-down operation.

8. The system of claim 1, wherein the return line is opened to cool down the high pressure pump in the standby mode for changing a fuel of the engine from oil to the LNG.

9. The system of claim 1, wherein the high pressure pump is configured to stop during the standby mode.

* * * * *